J. H. CLARK.
Pipe-Joint.
No. 214,812. Patented April 29, 1879.
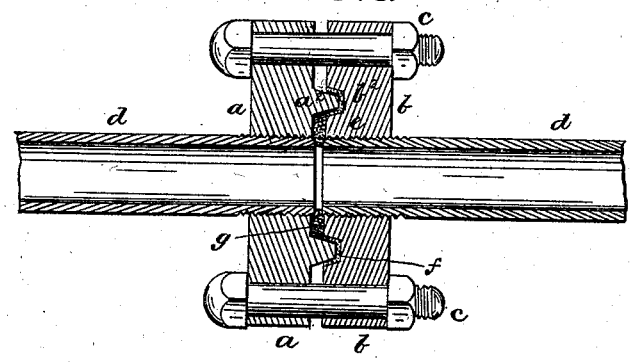
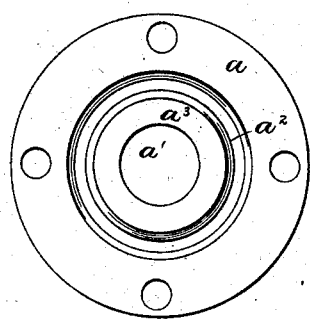
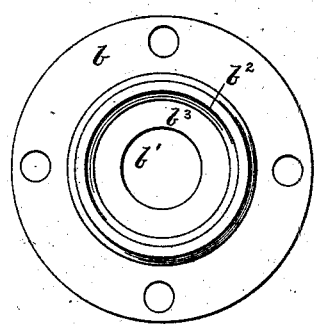
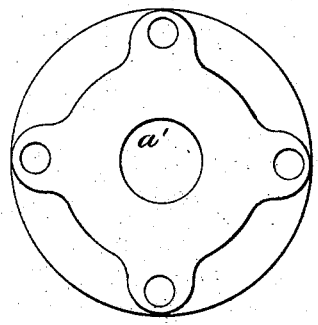
WITNESSES
Saml R. Turner
J B Holderby
INVENTOR
John H Clark
By R S & A P Lacey
ATTORNEYS.

UNITED STATES PATENT OFFICE.

JOHN H. CLARK, OF DUNMORE, PENNSYLVANIA.

IMPROVEMENT IN PIPE-JOINTS.

Specification forming part of Letters Patent No. 214,812, dated April 29, 1879; application filed March 6, 1879.

*To all whom it may concern:*

Be it known that I, JOHN H. CLARK, of Dunmore, in the county of Lackawanna and State of Pennsylvania, have invented certain new and useful Improvements in Pipe-Joints; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to provide a pipe-coupling from which the pipes may be readily removed when desired, and in which the ends of the abutting pipes are packed by the movement of screwing them into the coupling-plates.

It consists in a collar composed of two plates, held together by suitable bolts, and which have formed in them central threaded openings, into which the ends of the pipes are screwed, one of said plates being formed with a groove or channel surrounding and located outward from its central opening, and the other plate being provided with a projection corresponding in shape and location to the groove in the opposite plate, but of such length that when fitted snugly into said groove the faces of the plates will be held separated, thereby providing an enlarged packing space or chamber, in which is placed a heavy packing-ring, for the purpose of packing the abutting ends of the pipes to prevent leakage along the threads thereof, as will be hereinafter fully explained.

In the drawings, Figure 1 is a longitudinal section of a pipe-joint constructed according to my invention; and Figs. 2, 3, and 4 are detail views of the coupling-plates.

$a$ and $b$ are the coupling-plates, which are held together by the bolts $c$, put through suitable corresponding holes in their rims or outer edges, as shown. The plates are provided with central openings, $a^1$ and $b^1$, having female threads, into which the ends of the pipes $d$ are turned, as shown.

$a^2$ is a flange or projection formed around and outward from the opening $a^1$, so as to provide the surface $a^3$, intervening between it and the said opening.

The plate $b$ has formed in it the recess or circular groove $b^2$, corresponding in shape and relative position with the projection $a^2$. The projection $a^2$ is longer than the groove $b^2$ is deep, so that it will hold the plates $a$ and $b$ separated, and provide an enlarged space or chamber, $e$, between its base and the openings $a^1$ $b^1$, as shown.

$f$ and $g$ are the packing-rings, made of any suitable material.

In putting the device together, I place the thin packing $f$ over or in the circular groove $b^2$, and the heavier packing-ring $g$ on the surface $a^3$.

The ends of the pipes $d$ may, if desired, be turned one or two threads past the inner surfaces of the plates, in order that the packing $g$ may be pressed firmly against and into the grooves of the threads thereon.

The plates being brought together and the bolts $c$ tightened, the packings $f$ and $g$ will be compressed and a tight joint will be made. No leak can take place outward between the plates, while the packing prevents any leaking along the threads of the pipes $d$.

In this device I have provided a substantial coupling or joint adapted to ordinary pipes. No special construction of the pipe itself is required.

Having thus described my invention, what I claim, and desire to secure by Letters Patent, is—

The pipe-coupling hereinbefore described, consisting of the plates $a$ and $b$, held by bolts $c$, and constructed with central threaded openings $a^1$ $b^1$, and with a channel, $b^2$, and a projection, $a^2$, which, when placed in the channel $b^2$, will hold the said plates separated, thereby providing an enlarged space, $e$, between the base of said projection and the central openings, and having a thin packing, $f$, and the thicker, heavier packing-ring $g$, all arranged and adapted to receive the threaded ends of the pipes $d$, substantially as and for the purpose set forth.

In testimony that I claim the foregoing as my own I affix my signature in presence of two witnesses.

JOHN H. CLARK.

Witnesses:
ANDREW J. CRANE,
JOHN BUTLER.